United States Patent
Herren

(10) Patent No.: US 6,279,715 B1
(45) Date of Patent: Aug. 28, 2001

(54) CHUTE LINER SYSTEM

(76) Inventor: Harold L. Herren, P.O. Box 160, Platteville, CO (US) 80651

(*) Notice: Subject to any disclaimer, the term of this patent is extended or adjusted under 35 U.S.C. 154(b) by 0 days.

(21) Appl. No.: 09/521,129

(22) Filed: Mar. 8, 2000

Related U.S. Application Data

(60) Provisional application No. 60/125,140, filed on Mar. 19, 1999.

(51) Int. Cl.[7] .................................................. B65G 11/16
(52) U.S. Cl. ........................................................... 193/33
(58) Field of Search ................... 193/33, 34; 198/735.3, 198/771, 860.3

(56) References Cited

U.S. PATENT DOCUMENTS

| | | | |
|---|---|---|---|
| 4,222,482 | * | 9/1980 | Kelley .................................. 198/735.3 |
| 4,982,832 | * | 1/1991 | Garbelman et al. ............... 198/735.3 |
| 5,735,377 | * | 4/1998 | Herren ................................... 193/33 |

* cited by examiner

Primary Examiner—Joseph E. Valenza
(74) Attorney, Agent, or Firm—Dean P. Edmundson

(57) ABSTRACT

A system is described for lining or protecting a working surface of a chute, hopper, trough, etc. or other material-handling equipment with a wear-resistant material. The system includes a framework of parallel elongated rails secured to the working surface and separated by spacer bars which define the spacing between adjacent rails. The framework is tack-welded to the working surface. A plurality of wear-resistant panels having opposing side edges are held in place on the rails. The side edges of the panels have recesses for frictionally engaging the rails, and worn panels can be easily removed and replaced when necessary.

10 Claims, 4 Drawing Sheets

CHUTE LINER SYSTEM

CROSS-REFERENCE TO RELATED APPLICATION

This application is based upon, and claims the benefit of, my Provisional Application No. 60/125,140, filed Mar. 19, 1999.

FIELD OF THE INVENTION

This invention relates to rock and gravel handling apparatus such as hoppers, chutes, troughs, mills, etc. More particularly, this invention relates to impact pads and wear pads for use in rock and gravel handling apparatus.

BACKGROUND OF THE INVENTION

Various types of material handling apparatus include metal surfaces which are subject to excessive wear. For example, the movement of rocks and gravel (e.g. in chutes or hoppers) against metal involves significant impact and friction which results in excessive wear.

The use of rubber and urethane pads fastened to metal surfaces to protect against abrasion and impact is known. For example, in my prior patent (U.S. Pat. No. 5,735,377) I describe a system in which impact or wear pads are bolted to a desired wear surface with bolts which are not exposed on the wear side of the pad. Although that system is very useful in reducing wear, the time and effort required for drilling the required holes is considerable.

Other prior systems use a roll or flat sheet of rubber or urethane which must be field cut to size, and holes must be cut in the rubber or urethane to align with holes in the metal to be protected. This is cumbersome and time-consuming.

Complicating the repair process is the fact that the chutes or hoppers are normally located several feet above the ground and are inclined at an angle to facilitate gravity flow of material (such as gravel or crushed rock) through the chute or hopper. For example, a chute is normally attached to the discharge end of a screen frame to direct discharged material onto a conveyor belt for transportation to other areas. The size of the material being discharged varies from large rocks to fine processed sand.

The top end of the chute liner is as wide as the screen deck from which it is receiving material. The bottom end of the chute is typically 2 to 4 feet wide, and the bottom end is narrower than the top end in order to concentrate the material from spilling out over the sides of the conveyor belt.

Gravel screens are always located at least 16 feet above the ground, and sometimes they are several stories in height. The reason for this is because the material being screened falls downwardly due to gravity each time it is processed. The chutes are attached to the screen deck and are thus located high off the ground. Thus, the accessibility for servicing the chutes is very difficult.

The crushed rock and sand traveling through the chute or hopper, etc. causes severe wear on the chute, hopper, etc. As a result, the bottom and side surfaces of the chute, etc. must be in good repair in order to prevent granulated material from leaking through holes in the bottom or side surfaces.

These chutes come in various lengths and widths. They are generally about 6 to 8 feet wide at the top and 2 to 4 feet wide at the bottom end. The length may vary from about 5 to 12 feet.

One present method for repairing a worn chute involves removing the chute from the screen deck and lowering it to the ground to remove worn liner sections and install new sections. This procedure may be impractical if it would cause the entire screening operation to shut down. Also, the use of cranes or other such equipment would be required. Concerning the repair itself, if an entire new liner is built for replacing the worn existing liner, this would be very expensive.

The use of urethane or rubber impact-resistant panels in screen decks has been known. The panels are held in place on a frame which is welded to the surface to be protected. The frame is normally supplied by the manufacturer as one long section which is cut to length (as required for a particular location in a particular deck, for example). The first section of frame is cut to required length and then welded to the metal surface to be protected. Then another length of frame is measured, cut and welded to the metal surface at a measured precise distance from the first frame section. This is critical because the impact-resistant panels to be attached to the frame have a predetermined width, and the adjacent frame sections must be precisely located in order to be able to frictionally engage the opposing side edges of the impact-resistant panels and hold them in place without the use of any fasteners or other hardware. Thus, the spacing of adjacent frame sections is critical and must be within about $1/16$ inch or less in order to properly receive and hold the impact-resistant panels during use.

The procedure of measuring the required length of the next frame piece, cutting it to length, measuring its proper location relative to the preceding frame piece, and welding it into place is repeated until the entire length of the screen deck has been covered. After all of the frame pieces have been properly installed, the individual impact-resistant panels are installed on the frame.

The foregoing snap-in impact-resistant panels have not been used in chutes, hoppers, etc. because of (a) poor accessibility to the chute itself (if the chute protrudes from the back of the screen deck and is inclined), and (b) the width of the chute is not standard (the width at the top end varies from 5 to 8 feet and the width at the bottom end is 2 to 4 feet; the length may vary from about 4 to 12 feet). These conditions make it extremely difficult to use a snap-in panel. It is very difficult to measure and weld frame sections to the surfaces of an inclined chute and achieve the required tolerance.

There has not heretofore been provided a system having the features and advantages provided by the present invention.

SUMMARY OF THE INVENTION

In accordance with the present invention there is provided a system for lining a chute, hopper, trough, etc. with a layer of impact pads to protect the metal surfaces of the equipment from abrasion and wear. No holes must be drilled in the equipment or in the impact pads, nor are bolts required to secure the pads in place. Further, worn impact pads or panels can be easily replaced in a chute, etc. without the necessity of removing the chute from its location of use.

In a preferred embodiment, the system of the invention comprises:

(a) a framework comprising a plurality of parallel rails secured to each other in a plane by means of spacer bars having a predetermined length, and being adapted to be secured to the working surface of the equipment to be protected (e.g. chute, hopper, trough, etc.); and (b) a plurality of wear-resistant pads or panels having a width such that the side edges of the panels will frictionally engage adjacent rails and be held in position on the rails.

The system is easy to install on a piece of equipment and does not require drilling of holes in either the equipment or the wear-resistant panels. Either rubber or urethane panels may be used.

The framework is light-weight and is readily and easily cut to the required dimensions. Each frame piece can be simply tack-welded to the surface to be protected. By including transverse spacer bars (i.e. bars which are perpendicular to the longitudinal axis of each rail) of predetermined length on each frame piece, the proper spacing of adjacent frame pieces or sections is automatically determined when the individual frame pieces are installed. This assures that the impact-resistant panels will properly attach to, and be retained by, the completed frame. If desired, a customer may order pre-assembled frame sections of particular dimensions.

The wear-resistant panels can be provided in any desired dimension, and odd-shaped panels can be pre-cut at the factory so that rapid installation is facilitated in the field.

Also, a customer can order a system of framework sections and wear-resistant panels for lining a chute, hopper, etc. of any given dimensions. The sections and the panels are thus produced to meet those specifications, and the customer can readily and easily install the system in a chute or hopper, etc. without having to detach the chute or hopper from the equipment to which it is normally attached for use. Then, if a particular wear-resistant panel, or multiple panels, become worn and must be replaced, the customer can order replacement panels from the manufacturer and they will be produced with the exact necessary dimensions. No field cutting of panels is required.

Other features and advantages of the system of the invention will be apparent from the following detailed description and the accompanying drawings.

BRIEF DESCRIPTION OF THE DRAWINGS

The invention is described in more detail hereinafter with reference to the accompanying drawings in which.

DETAILED DESCRIPTION OF THE INVENTION

Figure 1:
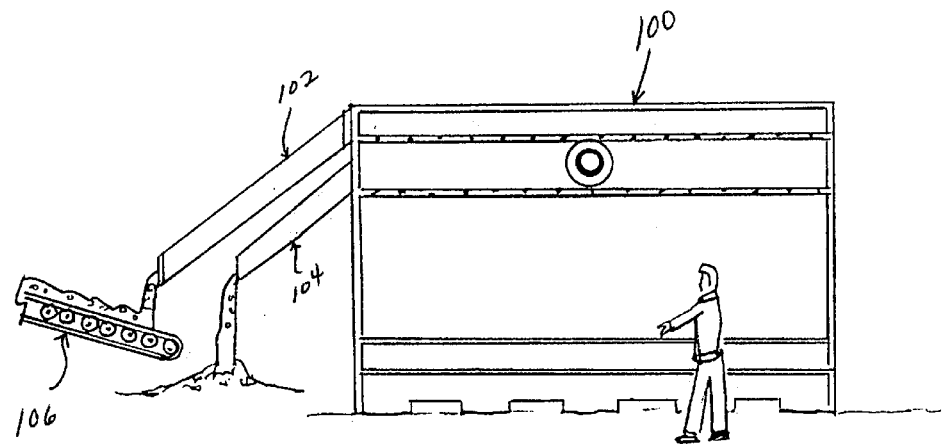
FIG. 1 is a side elevational view showing inclined chutes (attached to the discharge end of a screen deck) in which the chute liner system of the invention may be used.

FIG. 1 shows a screen deck 100 having inclined chutes 102 and 104 attached to the discharge end of the deck for receiving crushed rock or sand, etc. from the screen deck and directing it to a conveyor 106 (from chute 102) or to a pile (from chute 104).

Figure 2:
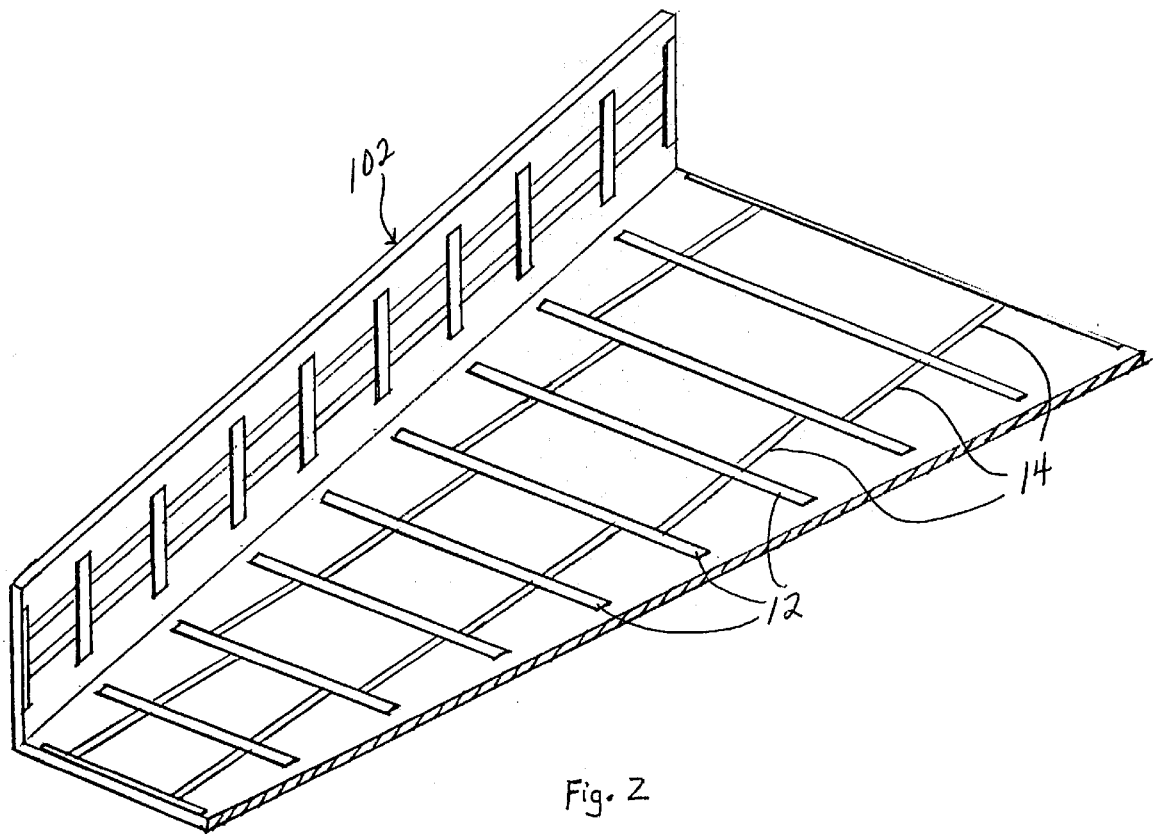
FIG. 2 is a perspective, cut-away, view of a chute to which framework has been secured to the working surfaces, after which impact- or wear-resistant panels are attached to the framework.

FIG. 2 is a perspective, cutaway view of a chute 102 showing a framework which has been secured to the bottom and side surface of the chute. The framework comprises a plurality of parallel rail members 12 which are secured (e.g., tack welded) in a plane to spacer bars 14 such that the rails remain parallel to each other at a predetermined spacing (preferably 12 inches). The spacer bars 14 are perpendicular to the rails 12.

Each framework section 10 (see FIG. 3) is positioned on a working surface in the chute 102 and then secured, e.g., by tack welding. Thus, there are framework sections secured to each working surface of the chute, hopper, trough, or other item to be protected. Wear-resistant panels can then be affixed to the framework to cover all working surfaces.

Figure 3:
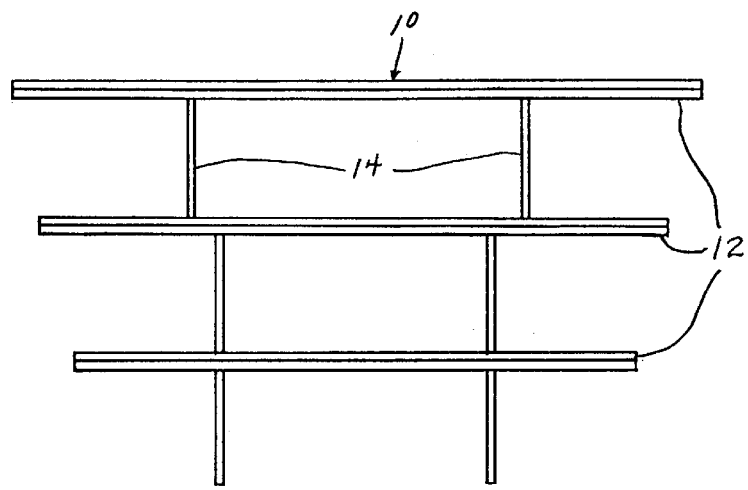
FIG. 3 illustrates a frame section used in the present invention.

FIG. 3 shows one section 10 of a framework which is useful in this invention. The framework section comprises a plurality of parallel rails held together by means of the spacer bars (which are transverse to the longitudinal axis of each rail). As illustrated, the rails 12 are of decreasing length (from the top of the section 10 to the bottom) because the section will be installed in a chute or hopper which tapers in width.

Figure 4:
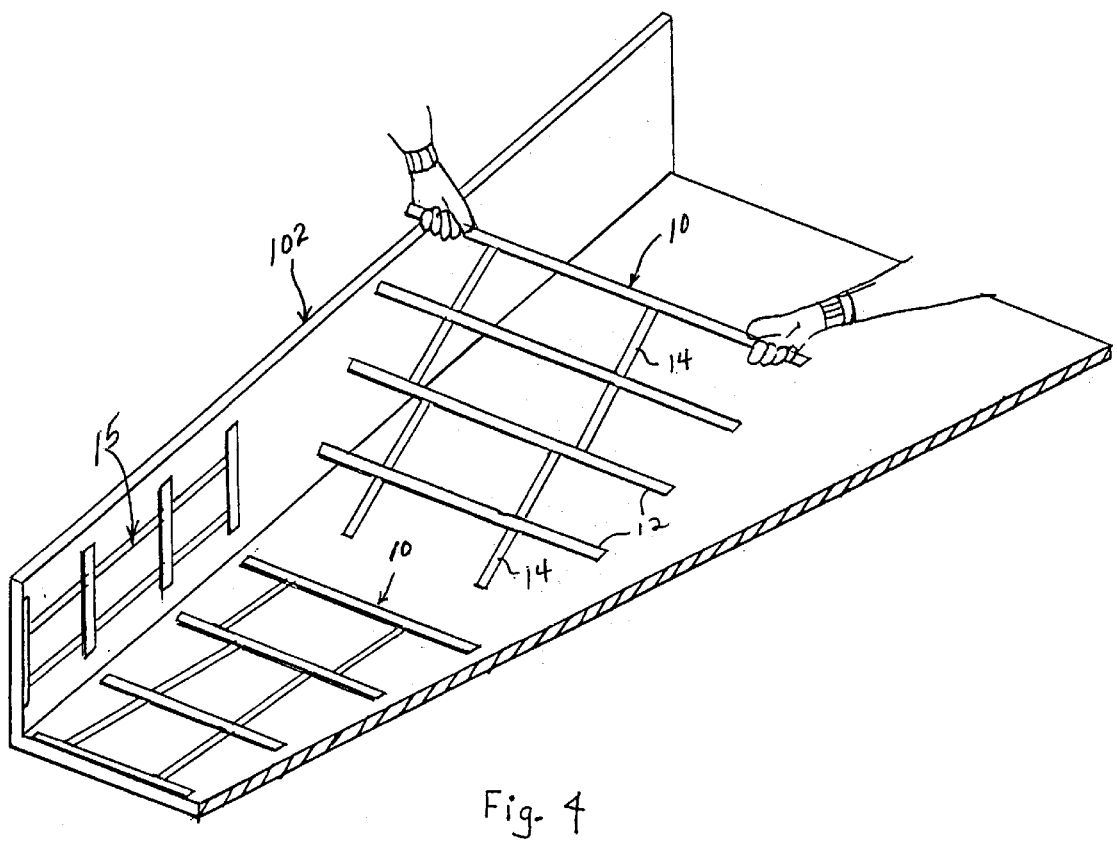
FIG. 4 shows a frame section being placed into a chute.

FIG. 4 shows the installation of framework sections to the working surfaces of a chute or trough 102. After the framework has been properly placed on the desired working surface, it is secured (e.g. by spot-welding it to the working surface). Several framework sections 15 are secured to the sides of the chute 102 so that wear-resistant panels can also be installed on the sides of the chute.

Figure 5:
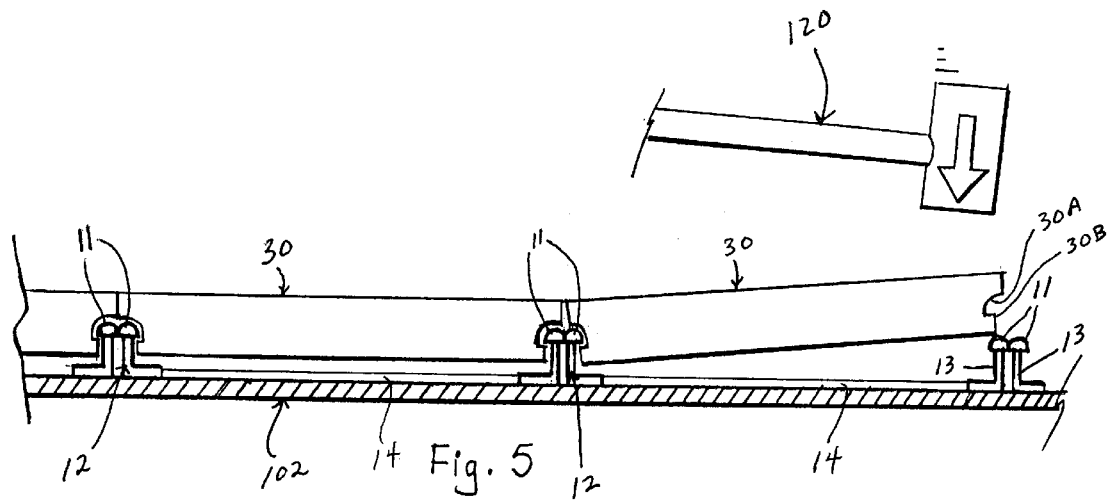
FIG. 5 shows impact-resistant pads being attached to framework in a chute.

Individual wear-resistant panels 30 are installed on the framework (e.g. by forcing them into frictional engagement between adjacent rails 12). This is illustrated in FIG. 5 where one panel 30 is shown in its intended working position between adjacent rails 12, and a second panel 30 is being forced into frictional engagement between adjacent rails 12 with mallet 120.

Each rail 12 comprises two abutting bar members 11 (having semi-circular cross-section) which are welded to the top of an angle iron 13. Bar members 11 are tack-welded to each other.

Opposite edges of each panel include a notched or recessed area 30A and a shoulder 30B. The width of each panel 30 is such that the panel will fit tightly between adjacent rails 12, with shoulder 30B fitting below the flat undersurface or lip of a bar 11, as shown, along each side edge of the panel. Typically the panels 30 must be forced down onto rails 12. Once a panel has been forced into position between adjacent rails, it will remain locked in place during use and will not come loose. If it is necessary to remove a panel, this can be done by prying one edge of the panel upwardly using a pry bar. The length and thickness of the panels 30 may vary, as desired.

The framework may be provided as an integral piece, although it usually is easier to provide the framework in three or four separate sections for ease of handling. The length of the spacer bars 14 along one end of one section then automatically set the proper spacing of the next section so that adjacent rails 12 on abutting frame sections are at the proper spacing in order to frictionally engage the edges of the wear-resistant panels.

The framework is relatively light in weight. Because it is positioned directly on, and secured to, a working surface of a chute, trough, hopper, etc. the framework is very adequately supported and will not sag or warp. After the wear-resistant panels have been installed between the rails, the panels remain in a fixed position during use and do not come loose.

If desired, the framework can be manufactured in a few standard sizes and then can be easily trimmed or cut in the field to accommodate the working surfaces of a particular chute, hopper, etc.

Figure 6:
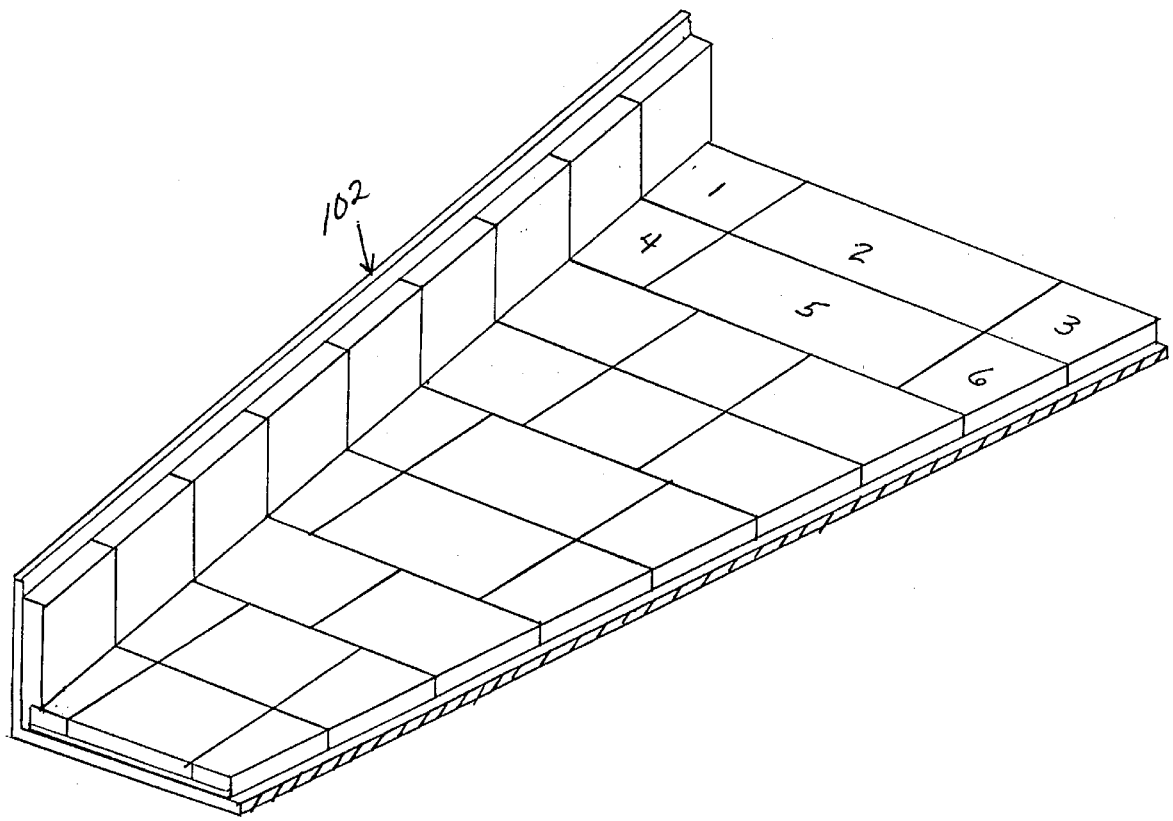
FIG. 6 is a perspective, cut-away, view showing a tapered chute which has been lined with the system of this invention and individual panel members have been marked or identified with numbers.

FIG. 6 illustrates a chute 102 which has been lined with parallel rows of wear-resistant panels in accordance with the system of the present invention. Each panel can be given a different identifying number. At the factory, each panel can be cut to the exact required dimension prior to installation on the chute at the job site. The required framework can also be cut to proper size at the factory to facilitate ease of installation on the working surface of the chute. In this manner, no field cutting of material is required. Also, if particular panels do wear out, the customer need only report the appropriate panel numbers to the manufacturer who can then cut replacement panels which will fit as required when provided to the customer.

Figure 7:
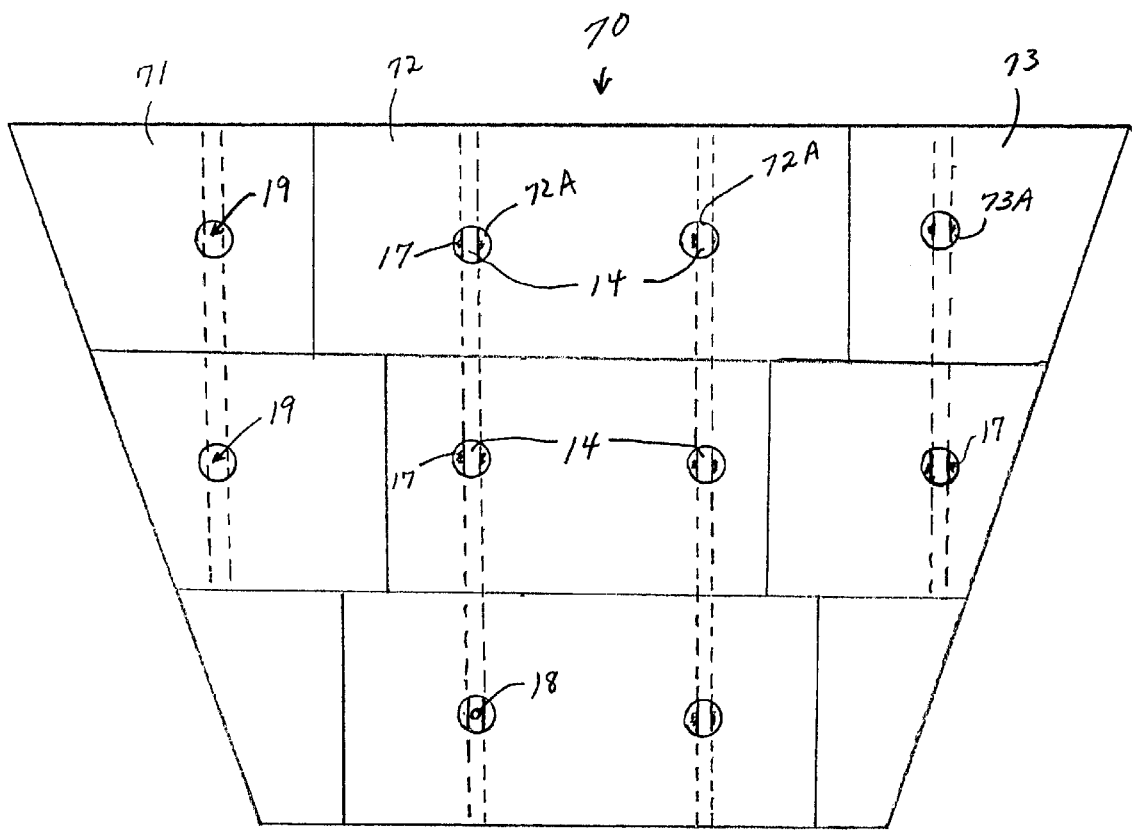
FIG. 7 is a top view illustrating another embodiment of the invention.

FIG. 7 illustrates another embodiment of the invention where a liner section 70 has been pre-assembled with panels 71, 72, 73, etc. installed on a metal frame section. Several of the panels have an opening therein identified as 72A, 73A, etc. The openings provide access to the spacer bars 14 in the framework in which the panels are frictionally retained. The diameter of each opening is about 1.5 to 2 inches.

This preassembled section can be installed in hoppers or bins, for example, where access by workers is quite limited for installation of the panel system shown in FIGS. 2–6. Attaching the panels to the framework at a location outside the bin or hopper is much easier for the workmen. Then the assembled section can be lifted into the bin and placed in the required position. The framework can then be secured to the interior metal surface of the bin by spot-welding the spacer bars 14 of the framework (through the openings 72A, 73A, etc.) to the bin metal surface. The spot welds 17 are shown in some of the openings. Alternatively, an appropriate hole can be drilled through the spacer bars and the underlying metal surface and a bolt 18 can be used to secure the spacer bar to the bin. After securing the spacer bars to the bin surface, a disc or plug 19 composed of rubber or urethane can be used to close the openings 72A, 73A, etc.

Other variants are possible without departing from the scope of this invention.

What is claimed is:

1. A system for lining a working surface of a chute, hopper, trough or other material-handling equipment with a wear-resistant material, said system comprising:
   (a) framework comprising a plurality of parallel rails secured to each other in a plane by means of spacer bars defining the spacing between said rails; wherein said framework is adapted to be secured to said working surface;
   (b) a plurality of wear-resistant panels having opposing side edges which frictionally engage adjacent rails and are thereby held in position on said rails.

2. A system in accordance with claim 1, wherein said spacer bars are disposed perpendicular to said rails.

3. A system in accordance with claim 2, wherein said panels are of equal length and width.

4. A system in accordance with claim 2, wherein each said rail comprises an elongated bar member secured to an angle iron.

5. A system in accordance with claim 4, wherein said side edges of each said panel includes a recess and a shoulder; wherein said recess is adapted to receive said elongated bar member of one of said rails.

6. A system for protecting a working metal surface of a chute, hopper, trough or other material-handling equipment with a wear-resistant liner, said system comprising:
   (a) a framework comprising a plurality of parallel elongated rails secured to said working surface, wherein each said rail has secured thereto a plurality of spacer bars of equal length defining the spacing between adjacent ones of said rails; wherein said spacer bars are perpendicular to said rails;
   (b) a plurality of wear-resistant panels having opposing side edges which frictionally engage adjacent ones of said rails and are thereby held in position on said rails.

7. A system in accordance with claim 6, wherein said rails are tack-welded to said working surface.

8. A system in accordance with claim 7, wherein each said rail comprises an elongated bar member secured to an angle iron.

9. A system in accordance with claim 8, wherein said side edges of each said panel includes a recess and a shoulder; wherein said recess is adapted to receive said elongated bar member of one of said rails, and wherein said shoulder engages said bar member.

10. A system in accordance with claim 6, wherein at least one of said panels includes an opening therethrough to access one of said spacer bars and enable said spacer bar to be secured to said working surface; and further comprising a plug to close said opening.

\* \* \* \* \*